No. 754,489. PATENTED MAR. 15, 1904.
J. H. K. McCOLLUM.
GOVERNOR VALVE FOR TURBINE ENGINES.
APPLICATION FILED JAN. 19, 1903.
NO MODEL.

Witnesses. Inventor:

No. 754,489. Patented March 15, 1904.

UNITED STATES PATENT OFFICE.

JAMES HARRY KEIGHLY McCOLLUM, OF TORONTO, CANADA, ASSIGNOR OF ONE-HALF TO JOHN WYCLIFFE LOWES FORSTER, OF TORONTO, CANADA.

GOVERNOR-VALVE FOR TURBINE-ENGINES.

SPECIFICATION forming part of Letters Patent No. 754,489, dated March 15, 1904.

Application filed January 19, 1903. Serial No. 139,665. (No model.)

*To all whom it may concern:*

Be it known that I, JAMES HARRY KEIGHLY MCCOLLUM, electrician, of the city of Toronto, in the county of York, in the Province of Ontario, Canada, have invented certain new and useful Improvements in Governor-Valves for Turbine-Engines, of which the following is a specification.

My invention relates to improvements in steam-governors for turbine-engines; and the object of the invention is to devise a simple, efficient, and sensitive governor for this class of engine by which the speed of rotation may be constant under variable loads, and whereby also, practically, boiler-pressure will be given at all times in the engine, and thereby render it especially adaptable for running electric generators; and it consists, essentially, of a valve-chest connected to the casing of the engine by a suitable passage-way, a cylindrical valve located in the same, and a governing device driven from the main shaft of the engine through worm-gear and operatively connected to the valve, the parts being otherwise arranged and constructed in detail as hereinafter more particularly explained.

Figure 1:
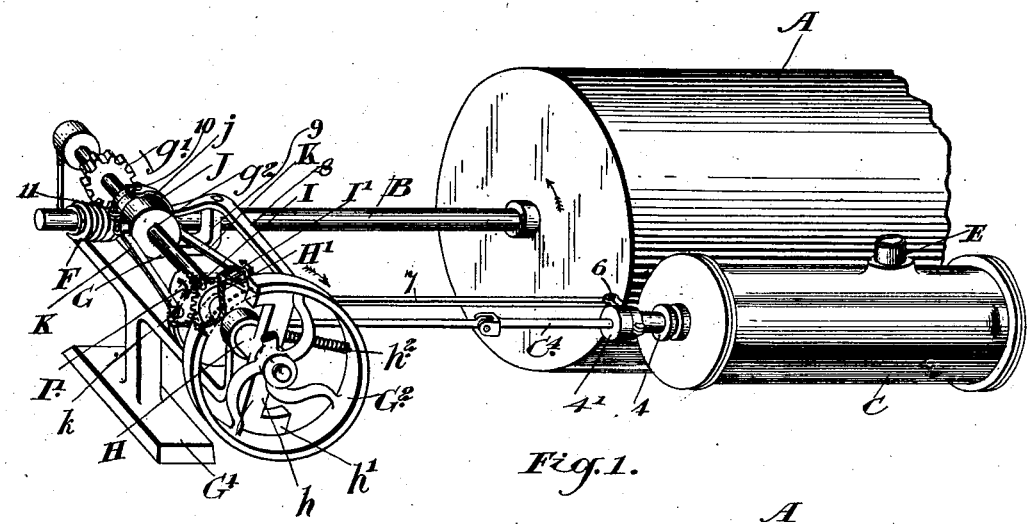
Figure 2:
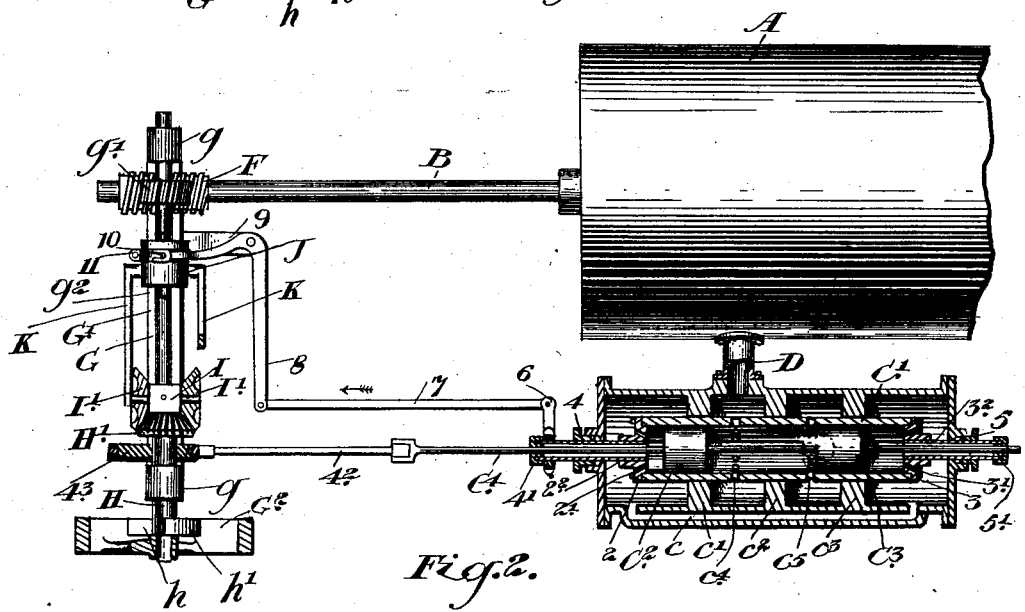

Figure 1 is a perspective view showing portion of the casing of a turbine-engine and my governor attached thereto. Fig. 2 is a plan view of the valve and portion of the governor in section.

In the drawings like charcters of reference indicate corresponding parts in each figure.

A is the casing of the turbine-engine, and B the main shaft; C, the valve-chest; D, the pipe leading from the valve-chest to the engine, and E the steam-inlet pipe.

F is a worm secured on the shaft B.

G is a cross-shaft which is supported in suitable bearings $g$ $g$, forming portion of the standard-bracket G'.

$G^2$ is a fly-wheel on the end of the shaft.

$g'$ is a worm-wheel meshing with the worm F on the main shaft B.

H is a sleeve through which the shaft G extends. The sleeve H has attached to or forming part of the outer end thereof the arms $h$, with heavy ends $h'$, one of the arms being connected by the spring $h^2$ to the fly-wheel $G^2$. On the inner end of the sleeve H, I provide a bevel-gear H'.

I is a trunnion secured on the shaft G and having journaled on the pins on each side thereof the bevel gear-wheels I' I', which mesh with the bevel gear-wheel H'.

J is a slidable collar, which is held from rotation on the cross-shaft G by the key $g^2$. The collar J has a groove $j$, as indicated.

K represents connecting-rods, which have pivotal connection at one end to the collar J, one of the connecting-rods being located on each side and being connected at the opposite end to crank-pins $k$, protruding from the bevel gear-wheels I'. The crank-pin of one of the bevel gear-wheels I' is set diametrically opposite in relation to the crank-pin on the other on account of the gears I' rotating in opposite directions upon any change of speed.

The valve-chest C is provided at the outer thereof with the passage-way $c$ and is also provided with internal annular projections $c'$, $c^2$, and $c^3$.

C' is a cylindrical valve-casing which is provided with two circles of holes or ports $c^4$ and $c^5$.

The valve-casing C' is provided with heads 2 and 3, having end ports 2' and 3' and tubular extensions $2^2$ and $3^2$, which extend through the stuffing-boxes 4 and 5 in the ends of the valve-chest.

$C^2$ and $C^3$ is a double piston-valve, the rod $C^4$ of which extends out through stuffing-boxes 4' and 5' at the outer end of the tubular extensions $2^2$ and $3^2$ of the valve-casing C'. As I wish to provide for the use of superheated steam, the piston-valves $C^2$ and $C^3$ are made to fit the valve-casing as closely as possible without touching, so as to prevent friction and the consequent necessity of lubrication, and yet are of course made almost steam-tight. The casing C' is similarly fitted into the annular projections $c'$, $c^2$, and $c^3$. The valve-rod $C^4$ extends out through the stuffing-box 4' and is connected by a suitable coupling to the rod $4^2$ of the eccentric $4^3$, secured on the sleeve H. The tubular extension $2^2$ of the valve-casing has secured to it at the outer end an arm 6, which is connected by a rod 7 to a bell-crank 8, pivoted on an arm 9, forming part of the casting G'. The short end of the bell-crank is forked and is connected by pins 10 to a metal strap 11, which fits into the groove $j$ in the collar J.

Having now described the principal parts involved in my invention, I shall briefly describe its operation and utility. The shaft of the engine is supposed to be caused to rotate in the direction indicated by arrow. Under ordinary circumstances when the load on the engine is normal the position of the cylindrical casing would be as shown in Fig. 2, with the ports $c^4$ and $c^5$ an equal distance from the central annular projection $c^2$. The pistons $C^2$ and $C^3$, driven from the eccentric $4^3$, will reciprocate, but will not while the casing is central pass onto the ports $c^4$ and $c^5$, as the throw of the pistons will not be sufficient. The steam entering through the inlet-pipe E passes into the space between the annular projections $c^2$ and $c^3$ through the ports $c^5$ and outwardly through the ports $c^4$ into the annular space between the projections $c'$ and $c^2$, thence through the pipe D into the engine. Any steam that leaks out around the pistons on the inside of the cylinder passes into the ends of the cylindrical casing and out through the ports 2' and 3' into the valve-chest, the passage-way $c$ serving to equalize the pressure at the outer ends of the valve-chest, casing, and pistons, thereby maintaining a perfect valve-balance throughout.

In the case of a generator particularly should the load on the engine be reduced or should there be only a light load on the engine, arising from various causes, which it is not necessary here to mention, the governor would check the full supply of steam as follows: Immediately upon the shaft B starting to increase in speed due to the light load the fly-wheel $G^2$, which is caused to rotate in the direction indicated by arrow by the means which I have hereinbefore described, would have a tendency to rotate faster than the arms $h$, or, in other words, the arms would lag behind, thereby, theoretically speaking, imparting to the arms a reverse movement and as the gear-wheel H' is secured to the same sleeve H as the arms such reverse movement would impart to the gear-wheels I' a movement in the direction indicated by arrows, thereby throwing the collar J by means of the connecting-rods K inwardly on the shaft G and tilting the bell-crank 8 so as to draw upon the rod 7, and consequently the cylindrical casing C', and bring the ports $c^4$ closer to the projections $c'$, so that the piston $C^2$, which is driven from the eccentric $4^3$, will periodically cover the ports $c^4$, and thereby cut off the supply of steam from time to time, the length of the periods of cut-off being of course determinate upon the lightness of the load. The inlet for the steam will not be interfered with through the ports $c^5$ into the interior of the casing; but the supply of the steam to the cylinder through the pipe D will necessarily be checked in exact ratio to the lightness of the load on the engine. Should, however, there be an overload on the engine, necessarily the movement of the shaft B would be retarded, and consequently the fly-wheel $G^2$ would be reduced in speed and the arms $h$ would relatively advance on the speed of the fly-wheel $G^2$, and consequently the bevel gear-pinion H' would drive the pinions I' in the opposite direction to that indicated by arrows, thereby drawing the collar J outwardly and throwing the bell-crank and rod 7 so as to cause the cylindrical casing C' to move in the opposite direction and bring the ports $c^5$ close to the annular projections $c^3$ and underneath the piston $C^3$, so that such piston in its movement would cover the ports, and thereby the supply of steam would be cut off and the engine stopped.

The wheel $G^2$ and the arms $h$, connected thereto by the spring $h^2$, is a form of governor known as an "inertia" governor and is at present in use and is the form of governor which I prefer to use in connection with my device.

It will be seen from this description that I have provided a very simple and efficient means for governing a turbine-engine by which the variation in load may be readily provided for, which is an important desideratum not only in connection with electrical generators, but also in connection with large steamships, where the propelling-wheel is liable to come out of the water. It will also be seen that the valves are perfectly balanced and practically frictionless in their movement and that therefore practically no power is required to be exerted by the governing portion of the device in moving such valve.

Although in this specification I have referred to the use of my governor for turbines particularly in reference to electric generators and its use in steamships, it will of course be understood that it may be applied with equal facility to all classes of marine or stationary work.

What I claim as my invention is—

1. In a turbine-engine, a governing-valve comprising a valve-chest and inlet thereinto, and outlet to the turbine, a balanced double piston-valve having a fixed regular stroke, and an adjustable balanced cylindrical single casing within which such valve has movement and having two sets of ports located centrally of the casing and communicating with the separate spaces between the casing and the valve-chest, and so arranged that under load the ports when opened are always opened wide as specified.

2. In a turbine-engine, the combination with the governing-valve comprising a valve-chest and inlet thereinto, and outlet to the turbine, a balanced double piston-valve having a fixed regular stroke, and an adjustable balanced cylindrical single casing within which such valve has movement and having two sets of ports located centrally of the casing and communicating with the separate spaces between the casing and the valve-chest, and so arranged that under load the ports when opened are always opened wide, of the valve-rod connected to the piston and the drive for the same, and the sleeve extending from the end of the casing and through which the valve-rod extends, a governor and means connecting the governor to the sleeve as and for the purpose specified.

3. In a governing-valve for turbines, the combination with the valve-chest having stuffing-boxes and internal annular rings, of the valve-casing provided with a circle of inlet and a circle of outlet ports and means for adjusting the same longitudinally and a double piston-valve located within the same and deriving a uniform movement as and for the purpose specified.

4. In a governing-valve for turbines, the combination with the valve-chest having stuffing-boxes and internal annular rings, of the valve-casing provided with a circle of inlet and a circle of outlet ports and tubular extensions extending through the stuffing-boxes of the valve-chest, and stuffing-boxes in the ends of such tubular extensions, and a piston-valve having a rod extending through the stuffing-boxes in the ends of the tubular extensions as and for the purpose specified.

5. In a governing-valve for turbines, the combination with the valve-chest having internal rings and the passage-way leading from one end of the valve-chest to the other outside of the rings, of the adjustable valve-casing provided with suitable inlet and outlet ports and end ports, and the double piston-valve located within the casing as and for the purpose specified.

JAMES HARRY KEIGHLY McCOLLUM.

Witnesses:
B. BOYD,
M. McLAREN.